J. N. ZIEGLER.
LEVEL.
APPLICATION FILED JUNE 22, 1911.
1,033,143. Patented July 23, 1912.
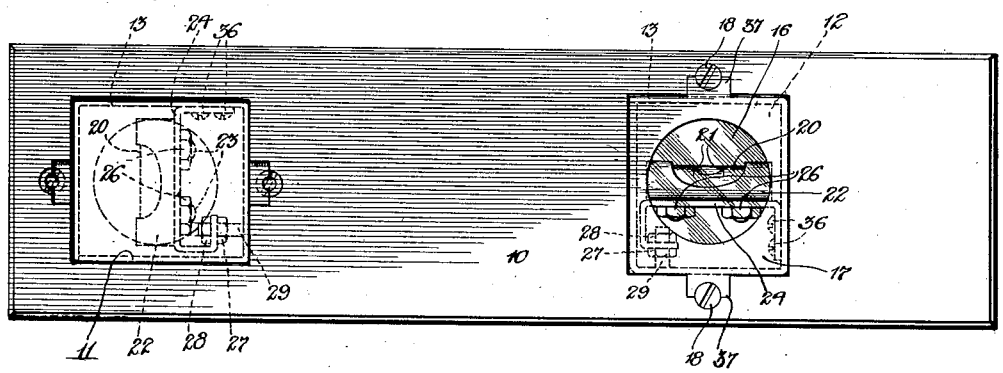
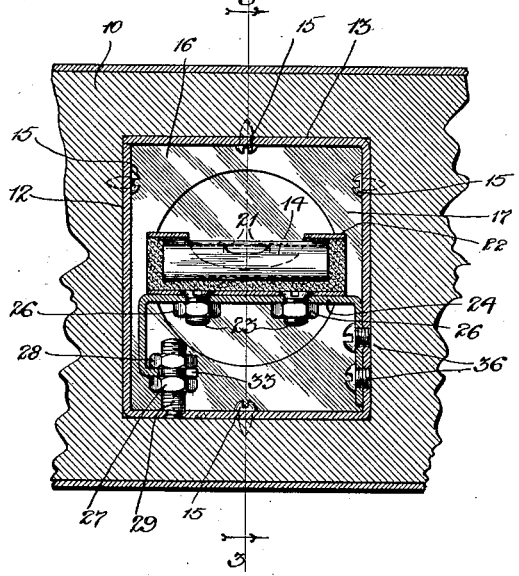 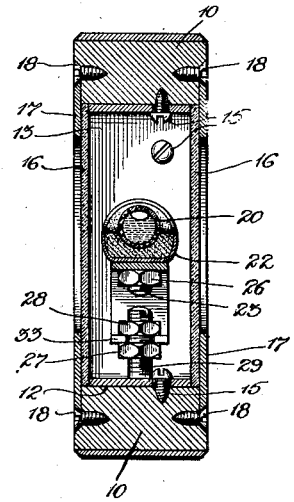
Witnesses:—
Inventor:—
John N. Ziegler
By: Fred Garlock
his Atty.

UNITED STATES PATENT OFFICE.

JOHN N. ZIEGLER, OF LA CROSSE, WISCONSIN.

LEVEL.

1,033,143. Specification of Letters Patent. Patented July 23, 1912.

Application filed June 22, 1911. Serial No. 634,714.

*To all whom it may concern:*

Be it known that I, JOHN N. ZIEGLER, a resident of La Crosse, in the county of La Crosse and State of Wisconsin, have invented certain new and useful Improvements in Levels, of which the following is a full, clear, and exact description.

The invention relates to levels or instruments for determining whether a surface is vertical or horizontal.

One object of the invention is to provide an improved instrument which may be used either as a plumb for determining whether a surface is vertical or horizontal and in which the spirit-indicator may be conveniently transferred from one pocket to another, according to whether the instrument is to be used on a vertical or a horizontal surface.

The invention further designs to provide a level of improved construction, and which may be readily adjusted to determine different angles; for example, in the construction of a slightly tapered chimney or structure, so that when adjusted the instrument will indicate the correct angularity relatively to a truly vertical plane.

The invention further designs to provide a level of improved construction.

The invention consists in the several novel features hereinafter set forth and more particularly defined by claims at the conclusion hereof.

In the drawings; Figure 1 is a side elevation of a level embodying the invention, the indicator being shown in that pocket provided for it when it is to indicate the horizontality of a surface. Fig. 2 is a central longitudinal section, a portion of the bar being broken away. Fig. 3 is a section taken on line 3—3 of Fig. 2.

The instrument comprises a bar 10 which is adapted to be held on or against a surface, as well understood in the art. This bar is provided with two pockets 11 and 12 which extend laterally through the bar and are each adapted to receive a quadrangular frame 13 in which a spirit-indicator 14 is mounted. Pocket 11 is adapted to receive the frame 13 to hold the indicator substantially at right angles to the long edges of bar 10 and pocket 12 is adapted to receive said frame and to hold it so that the indicator will be substantially parallel to the long edges of the bar or surface against which the bar may be placed. By means of these pockets, frame 13 which is adapted to be removably held in the pockets, may be placed in either pocket so it will be disposed to indicate the angle of the edges of the bar relatively to horizontal or vertical planes or surfaces. For example, when the instrument is to be used as a plumb, the frame 13 with its indicator will be held in pocket 11, as indicated by dotted lines in Fig. 1, and when the side of the frame 10 is placed against a vertically extending surface or wall, the indicator 14 will be disposed at a right angle to said surface and will indicate the disposition of the wall, relatively to the vertical plane. When the frame 13 and the indicator 14 are placed in pocket 12 the indicator will be disposed in parallel relation with the edges of the bar 10, (as shown in full lines Fig. 1), and will indicate when the surface against which the bar may be held is horizontally disposed. Frame 13 is held in either of the pockets by screws 15, which can be removed whenever it is desired to transpose the indicator from one pocket to the other. Transparent plates 16 fit against the sides of frame 13, respectively, and a guard-plate 17 at each side of the bar, holds the transparent plates in the bar. Screws 18 are adapted to secure the guard-plate 17 to the frame 10, said plates being formed with notched ears 37 for the screws. It will be understood that when the indicator is to be removed from one pocket to another, screws 18 will be moved to permit removal of plates 16 and 17 and to permit access to the screws 15 which hold the indicator-carrying frame 13, in the pocket. The same screws and plates may be used for holding the frame 13 in either pocket.

The spirit-indicator 14 consists of a glass tube 20, containing a spirit or fluid in necessary quantity to leave a small space, which when it registers with indicating marks 21 on the tube will indicate that edges of the bar 10 are parallel to the horizontal or vertical planes, according to the position in which the indicator is placed in bar 10. This spirit-indicator is of usual construction, and is set in suitable material, such as plaster of Paris, in a metallic tube 22. The latter tube is secured to a bar 24 by screws 23 which extend through tube 22 and said bar, and nuts 26 which clamp the tube and bar together. One end of bar 24 is secured to one side of frame 13 by screws 36, and its other end extends downwardly and inwardly, and is adjustably sustained by a pair of nuts 27 and 28 on a screw-threaded post 29 which is secured to one side of frame 13. In turned end 33 of bar 24 is forked to fit or extend around post 29 and by adjusting nuts 27 and 28, one end of the bar and the indicator carried thereby, may be angularly adjusted in frame 13 or relatively to the edges of bar 10, bar 24 being formed of slightly flexible material, such as brass, which permits this adjustment. In this manner, the indicator may be adjusted, so that when a given angle relatively to the vertical or horizontal is desired, the indicator-tube may be adjusted to a nicety, to uniformly indicate that angle. This feature is of material advantage in the erection of chimneys or structures having a slight taper, and when the instrument is once set to indicate the desired angle, it may be continuously used until the structure has been completed.

The invention thus provides an instrument in which provision is made for transposing the spirit-indicator from one pocket to another, and so it will be disposed in the bar, to indicate the position of a surface relatively to either a horizontal or vertical plane or angular variation with respect to said planes. By removing screws 36 and nuts 28, the indicator and its carrying-bar may be removed in event replacement or repair is necessary.

The invention is not to be understood as restricted to the details set forth, since these may be modified by the skilled mechanic within the scope of the appended claims, without departing from the spirit and scope of the invention.

Having thus described the invention what I claim as new and desire to secure by Letters Patent is:

1. The combination of a bar having a pocket therein, a frame in said pocket, a spirit-indicator, an indicator-carrying bar extending across the frame, having one of its ends rigidly secured to one side of said frame, and having a downturned portion at its other side, and an inturned terminal on said downturned portion, an adjusting means between the inturned end of the carrying-bar and the bottom of said frame said indicator being mounted on said bar.

2. The combination of a bar having a pocket therein, a frame in said pocket, a spirit-indicator, an indicator-carrying bar extending across the frame, having one of its ends rigidly secured to one side of said frame, and having a downturned portion at its other side, and an inturned terminal on said downturned portion, a post secured to the bottom of the frame and having its upper end disposed below the cross-portion of said bar, and adjusting-means on said post, engaging said inturned terminal said indicator being mounted on said bar.

3. The combination of a bar having a pocket therein, a frame in said pocket, a spirit-indicator, an indicator-carrying bar, a shell around said indicator, means for removably securing said shell to the carrying-bar, and means for adjusting the bar in the frame.

4. The combination of a bar having a pocket therein, a rectangular frame having its outer face formed to fit against the inner faces of said pocket, face-plates for covering the sides of the pocket and substantially flush with the sides of the bar, said frame being disposed wholly within said pocket and separately formed from said plates, means for removably securing said plates to the bar, and a spirit-indicator carried in said frame.

5. The combination of a bar having a pocket therein, a rectangular frame having its outer face formed to fit against the inner face of said pocket, face-plates for covering the sides of the pocket and substantially flush with the sides of the bar, said frame being disposed wholly within said pocket and separately formed from said plates, means for removably securing said plates to the bar, transparent plates between the cover-plates and said frame, and a spirit-indicator carried in said frame.

6. The combination of a bar having a pocket therein, a frame fitting in said pocket, a spirit-indicator, adjustably mounted in said frame, said frame being disposed wholly within said pocket, face-plates covering the sides of said pocket said plates having notches in their edges, and removable means extending into said notches for securing the face-plates to said bar.

JOHN N. ZIEGLER.

Witnesses:
  OTTO BOSSHARD,
  GEO. W. BUNGE.

---

Copies of this patent may be obtained for five cents each, by addressing the "Commissioner of Patents, Washington, D. C."